(12) United States Patent
Fainello

(10) Patent No.: US 9,725,020 B2
(45) Date of Patent: Aug. 8, 2017

(54) HIGH-PERFORMANCE SPORTS CAR

(71) Applicant: Ferrari S.p.A., Modena (IT)

(72) Inventor: Marco Fainello, Modena (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 15/097,945

(22) Filed: Apr. 13, 2016

(65) Prior Publication Data

US 2016/0304006 A1   Oct. 20, 2016

(30) Foreign Application Priority Data

Apr. 14, 2015  (IT) ............................... BO2015A0175

(51) Int. Cl.
| | | |
|---|---|---|
| *B60N 2/42* | (2006.01) | |
| *B62D 21/18* | (2006.01) | |
| *B60J 5/04* | (2006.01) | |
| *B60N 2/30* | (2006.01) | |
| *B62D 31/00* | (2006.01) | |
| *B60N 2/48* | (2006.01) | |
| *B60R 21/04* | (2006.01) | |

(52) U.S. Cl.
CPC .......... *B60N 2/4235* (2013.01); *B60J 5/0401* (2013.01); *B60J 5/045* (2013.01); *B60J 5/0422* (2013.01); *B60J 5/0425* (2013.01); *B60J 5/0455* (2013.01); *B60J 5/0493* (2013.01); *B60N 2/30* (2013.01); *B60N 2/4256* (2013.01); *B60N 2/4882* (2013.01); *B60R 21/0428* (2013.01); *B62D 21/183* (2013.01); *B62D 31/00* (2013.01)

(58) Field of Classification Search
CPC .. B60N 2/4235; B60N 2/4256; B60N 2/4882; B60J 5/0425; B60J 5/0493; B60R 21/0428; B62D 21/183
USPC ........................ 296/187.05, 68.1, 146.6, 152; 297/216.12, 395
See application file for complete search history.

(56) References Cited

U.S. PATENT DOCUMENTS

| | | | | |
|---|---|---|---|---|
| 3,851,919 | A * | 12/1974 | Nagy .................... | B60N 2/4879 248/118 |
| 4,440,443 | A | 4/1984 | Nordskog | |
| 4,838,575 | A | 6/1989 | Livingston | |
| 5,033,236 | A * | 7/1991 | Szerdahelyi ........... | B60J 5/0416 280/730.2 |
| 6,267,436 | B1 * | 7/2001 | Takahara ................ | B60R 13/02 296/187.05 |

(Continued)

FOREIGN PATENT DOCUMENTS

| | | |
|---|---|---|
| DE | 10 2008 017 977 A1 | 10/2009 |
| EP | 0 096 188 A2 | 12/1983 |

(Continued)

*Primary Examiner* — Jason S Morrow
(74) *Attorney, Agent, or Firm* — Blank Rome LLP

(57) ABSTRACT

A high-performance sports car having: a frame that supports a pair of front wheels and a pair of rear wheels; a passenger compartment that is formed on the inside of the frame and is arranged between the front wheels and the rear wheels; at least one door, which is hinged to the frame to allow access to the passenger compartment; at least one seat, which is arranged inside the passenger compartment to the side of the door; and a rigid protection panel which is integral with the door and, when the door is closed, is arranged alongside the seat in line with the head of the occupant of the seat.

10 Claims, 3 Drawing Sheets

(56) References Cited

U.S. PATENT DOCUMENTS

| | | | |
|---|---|---|---|
| 2002/0038966 A1* | 4/2002 | Doehrer | B60N 2/00 297/216.16 |
| 2014/0110964 A1 | 4/2014 | Schijve et al. | |
| 2016/0200226 A1* | 7/2016 | Dellanno | B60N 2/42772 297/216.12 |
| 2016/0272327 A1* | 9/2016 | Baker | B64D 11/0642 |
| 2016/0311302 A1* | 10/2016 | Uki | B60K 5/1216 |

FOREIGN PATENT DOCUMENTS

| | | |
|---|---|---|
| EP | 1 340 640 A1 | 9/2003 |
| FR | 2 939 740 | 6/2010 |
| FR | 2 950 578 | 4/2011 |
| FR | 2 955 809 | 8/2011 |

\* cited by examiner

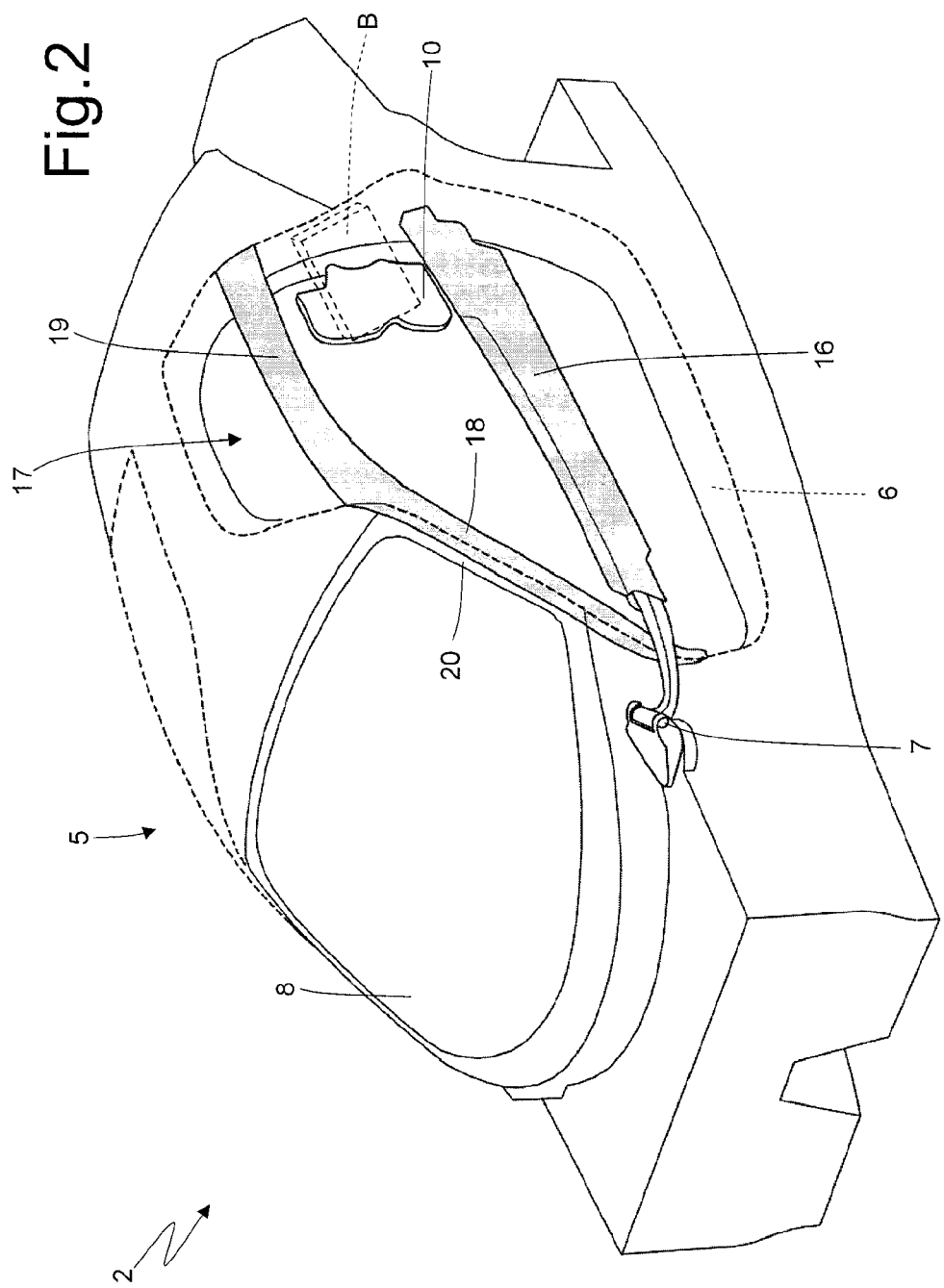

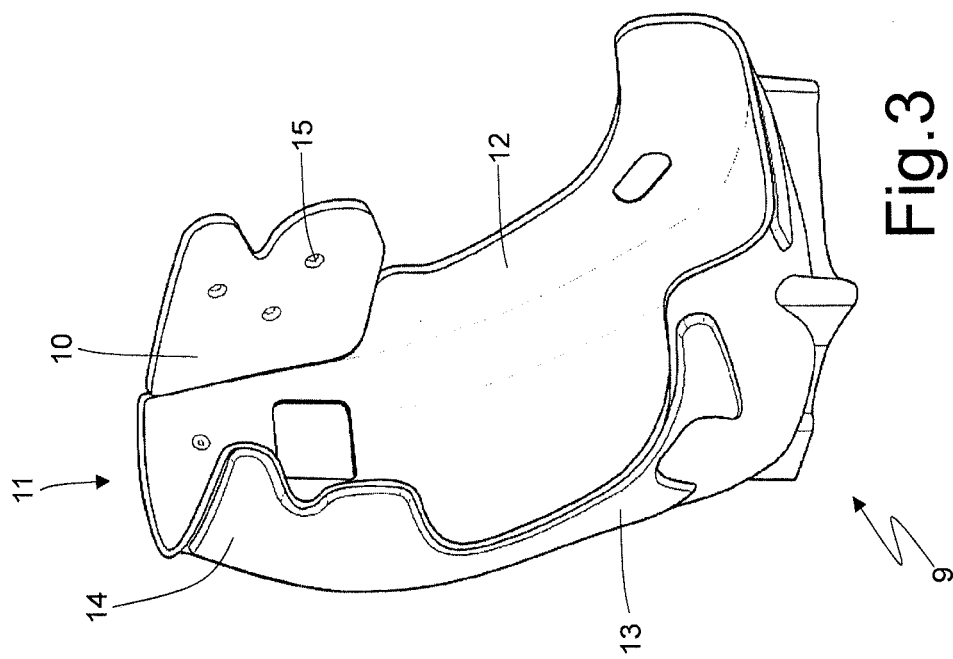
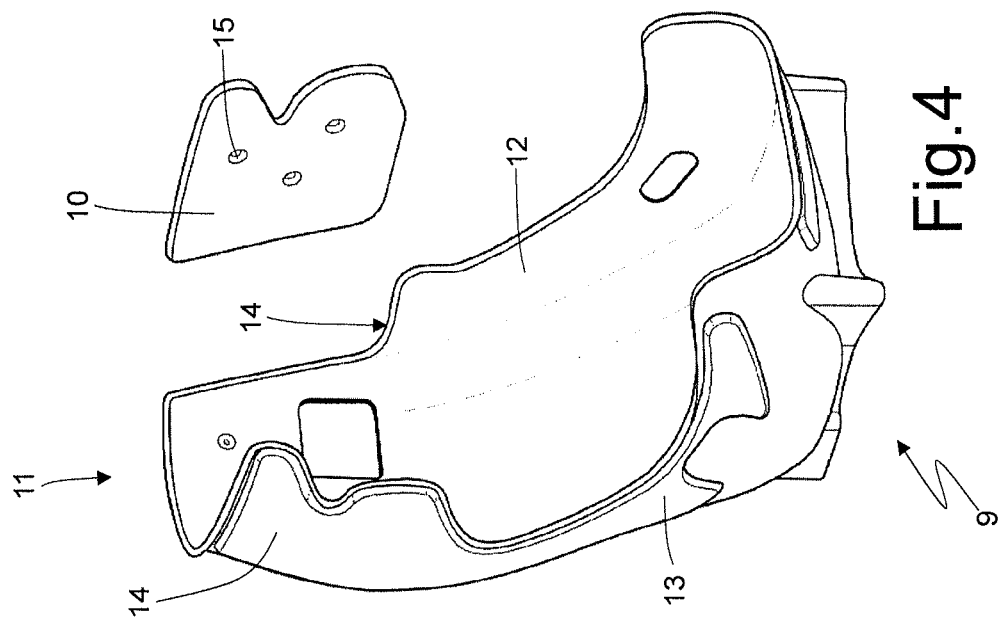

HIGH-PERFORMANCE SPORTS CAR

TECHNICAL FIELD

The present invention relates to a high-performance sports car.

The present invention has beneficial application to a high-performance sports car specifically for on-track use.

BACKGROUND OF THE INVENTION

In a high-performance sports car intended for on-track use it is essential to ensure that the driver has adequate protection in the event of an accident. For this reason, a survival cell is provided in the passenger compartment that is extremely strong so as to avoid deformation in the event of an extremely violent collision and is arranged in a central position. Controlled deformation elements are usually arranged in front of and behind the survival cell, which are designed to deform in the event of a collision so as to dissipate as far as possible the vehicle's kinetic energy at the moment of impact while preserving the integrity of the survival cell and reducing the decelerations to which the occupants of the survival cell are subjected.

The survival cell is protected on either side by lateral protection that prevents the intrusion of external objects. A first type of lateral protection consists of reinforcing bars which are attached to the frame (for example by welding or by gluing). A second type of lateral protection consists of a rigid protection shell that envelops each seat and has side boards that extend further, in line with the driver's head, so as to completely or almost completely cover the driver's head.

However, the side protections described above constitute a significant impediment to the entry and exit of the car's driver (and, where applicable, of the passenger); the entry and especially the exit from the car of the driver (and, where applicable, of the passenger) are thus relatively awkward operations, making difficult possible external help for the driver (and, where applicable, the passenger), among other things, after an accident.

The patent application FR2955809A1 and the patent application FR2939740A1 describe a car comprising a side headrest that is mounted to a side of the car movably (so as to make a rotary or a linear movement) and near to a corresponding rear seat so as to be positioned in an operating position in which the side headrest is located beside the rear seat in front of a door and in a stowed position in which the side headrest is positioned behind the rear seat and relatively far from the door.

The patent application FR2950578A1 describes a backrest of a rear seat of a small urban vehicle (a so-called A-segment "city car") equipped with a lower fixed part (i.e. anchored to the vehicle frame) and a movable upper part (i.e. anchored to a rear door of the vehicle) to facilitate access from the back to the rear seats for the loading of goods.

SUMMARY OF THE INVENTION

The purpose of the present invention is to deliver a high-performance sports car which is free of the drawbacks described above and, at the same time, is also cost-effective and easy to manufacture.

According to the present invention a high-performance sports car is delivered, as claimed in the appended claims.

BRIEF DESCRIPTION OF THE DRAWINGS

The present invention will now be described with reference to the accompanying drawings which illustrate an example of a non limiting embodiment, wherein:

FIG. 2 is a schematic perspective view of a central body of a frame of the car of FIG. 1;

FIG. 3 is a schematic perspective view of a seat of the car of FIG. 1; and FIG. 4 is a partially exploded schematic perspective view of a seat of the car of FIG. 3.

DETAILED DESCRIPTION OF THE INVENTION

Figure 1:
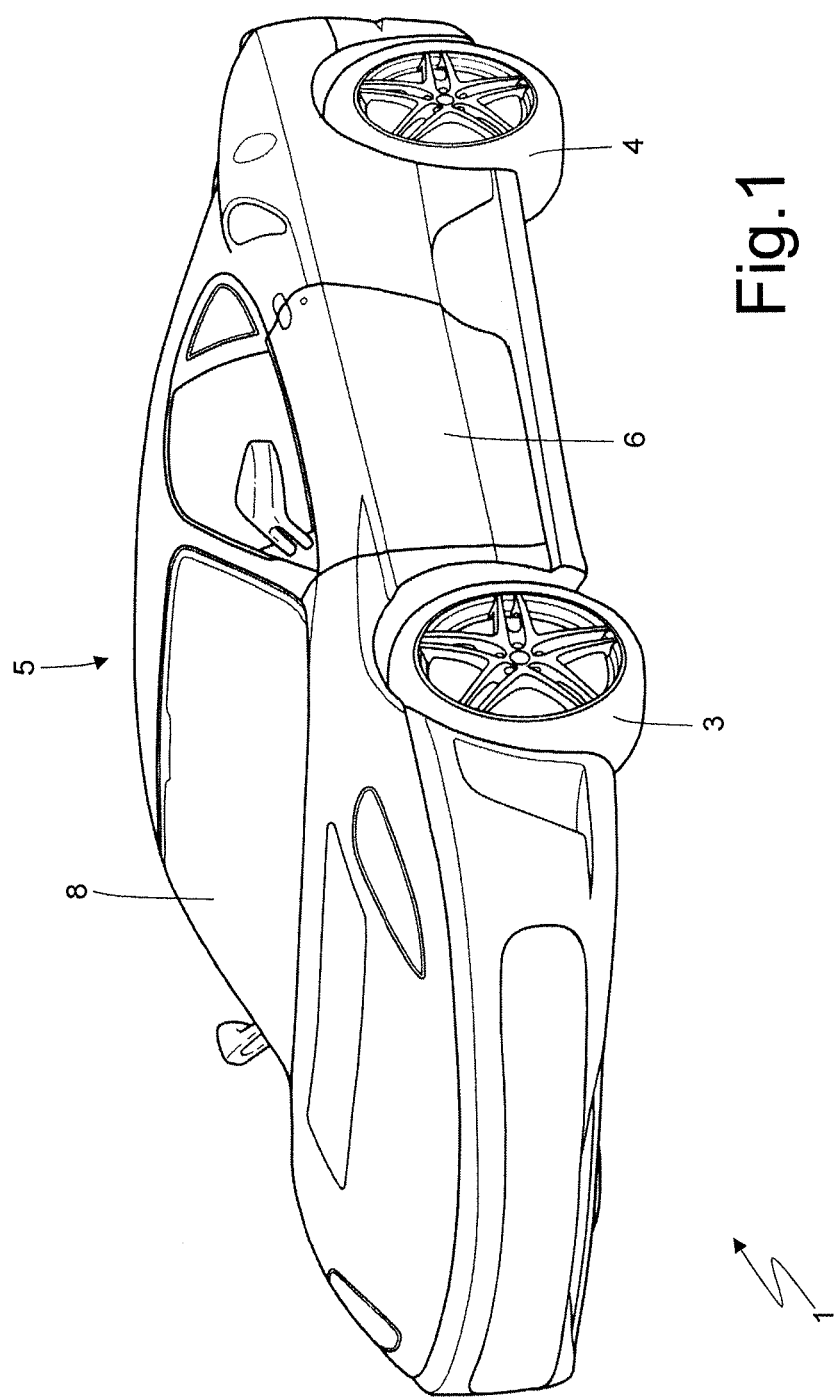
FIG. 1 is a schematic perspective view of a car made in accordance with the present invention.

In FIG. 1, the number 1 indicates in its entirety a rear (or central) engined high-performance sports car comprising a frame 2 (partially and schematically shown in FIG. 2), which supports a pair of front wheels 3 and a pair of rear wheels 4.

Between the front wheels 3 and the rear wheels 4, inside the frame 2 a passenger compartment 5 is obtained which is accessed through a pair of doors 6 which are hinged to the frame 2 by means of corresponding hinges 7 (one of which is shown in FIG. 2); the front of the passenger compartment 5 is delimited by a windscreen 8.

Inside the passenger compartment 5 there are two seats 9 (one of which is shown in FIGS. 3 and 4), each of which is arranged adjacent to a corresponding door 6. As illustrated in FIGS. 2, 3 and 4, in line with each door 6 a rigid protection panel is provided which is integral with the door 6 (i.e. it is rigidly connected to the door 6 as shown in FIG. 2) and, when the door 6 is closed, it is positioned alongside the seat 9 in line with the head of the occupant of the seat 9 (as shown in FIG. 3).

Each seat 9 comprises a rigid protection shell 11 having two side boards 12 and 13, which are arranged on opposite sides of the seat 9. The side board 12 of each protection shell 11 and which is arranged on the side of the corresponding door 6, has a window 14 that reproduces, in negative, the shape of the protection panel. When each door 6 is closed, the protection panel 10 which is integral with the door 6 is arranged substantially in contact with an edge of the window 14 of the side board 12 of the corresponding protection shell 11.

The side board 13 of each protection shell 11 is opposite the side board 12 and integrates, without interruptions, with a protection panel 14, which has, in a mirror-like manner, the same shape and the same size as the protection panel 10. It is therefore evident that the protection panel 10 arranged beside the door 6 is integral with the door 6 and so moves together with the door 6 away from the protection shell 11 when the door 6 is opened (as shown in FIG. 4), while the protection panel 14 is rigidly connected without interruption to the side board 12 of the protection shell 11 and therefore always remains integral with the protection shell 11 itself.

According to a preferred, but not limiting, embodiment, each protection panel 10 is mounted on a bracket B (schematically shown in FIG. 2) which, on one side, is rigidly connected to the protection panel 10 and, on the opposite side, is rigidly connected to the door 6; the bracket B is rigidly connected to the protection panel 10 by means of three screws inserted into corresponding holes 15 formed through the protection panel 10.

As illustrated in image 2, each door 6 comprises a lower reinforcement bar 16, which has a straight shape and is oriented longitudinally, and arranged in line with a central portion of the door 6. In addition, each door 6 comprises an upper reinforcement bar 17, which has the shape of an obtuse angle and is arranged in line with an upper portion of the door 6. Each lower reinforcement bar is arranged below the belt line (therefore below the window of the corresponding door 6) and each upper reinforcement bar 17 is arranged above the belt line (therefore above the window of the corresponding door 6). Each upper reinforcement bar 17 comprises an inclined front part 18 that runs along a post 20 of the windscreen 8 (obviously when the corresponding door 6 is closed) and a horizontal rear part 19.

The bracket B of each protection panel 10 is preferably rigidly connected, on the lower portion, to the lower reinforcement bar 16 and, on the upper portion, to the upper reinforcement bar 17; the protection panel 10 thus provides a particularly solid and robust anchorage and therefore gives a high degree of lateral protection in line with the head of the corresponding occupant of the passenger compartment 5.

According to a preferred, but not limiting, embodiment the front end of the lower reinforcement bar 16 ends in line with a hinge 7 of the door 6. In other words, each lower reinforcement bar 16 is attached to the frame 2 by means of the hinge 7 and therefore supports the entire door 6.

In the embodiment illustrated in the attached figures, the car 1 has two doors 6 and two seats 9 (for the driver and the passenger); according to different and perfectly equivalent embodiments, the car 1 may have only one door 6 and/or only one seat 9 (i.e., only the driver's seat 9).

The car 1 described above has numerous benefits.

Firstly, the vehicle 1 described above provides good accessibility to the passenger compartment 5, i.e. entering and exiting the passenger compartment 5 is relatively easy and fast. In other words, the fact that the protection panel 10 for each seat 9 moves together with the door 6 when the door 6 is opened considerably facilitates entry and exit from the passenger compartment 5; at the same time, the protection offered to the occupants of the passenger compartment 5 is not in any way compromised because when each door 6 is closed the corresponding protection panel 10 rests on the protection shell 11 as in a traditional seat.

In other words, racing cars for track use are equipped with protection panels to protect the head of the driver (and, where applicable, the passenger) and prevent the intrusion of external objects into the passenger compartment; these protection panels constitute an impediment to access into and exit from the passenger compartment (thus restricting the ergonomics and the ability to move). By integrating the protection panel externally (i.e. from the side of the door) into the door as described above, the required protection is achieved without sacrificing access and comfort.

It is important to note that securing the bracket B of each protection panel 10 to the reinforcement bars 16 and 17 confers to the protection panel 10 a considerably greater mechanical strength (and therefore protection capability) than the mechanical strength obtainable by securing the protection panel 10 to the protection shell 11 of the seat 9 (as in traditional cars).

In addition, the car 1 described above provides a high degree of lateral protection for the occupants of the passenger compartment 5 thanks to the presence of the reinforcement bars 16 and 17; the particular arrangement and shape of the reinforcement bars 16 and 17 yields an optimum compromise between the need to have a high degree of lateral protection and the opposite need to limit weight and encumbrance.

Finally, the car 1 described above is easy and inexpensive to manufacture, because the required changes with respect to a similar conventional car are easy to implement.

The invention claimed is:

1. A high-performance sports car comprising:
   a frame, which supports a pair of front wheels and a pair of rear wheels;
   a passenger compartment, which is located on the inside of the frame and is arranged between the front wheels and the rear wheels;
   at least one door, which is hinged to the frame to allow access into the passenger compartment;
   at least one seat, which is arranged on the inside of the passenger compartment beside the door;
   a first rigid protection panel, which is integral to the door and, when the door is closed, is arranged beside the seat in line with the head of the person sitting in the seat;
   wherein the seat comprises a rigid protection shell having two side boards, which are arranged on opposite sides of the seat; and
   wherein a first side board of the protection shell, which is arranged on the side of the door, has a window that reproduces, in negative, the shape of the first protection panel.

2. A car according to claim 1, wherein, when the door is closed, the first protection panel is arranged in substantial contact with an edge of the window of the first side board of the protection shell.

3. A car according to claim 1, wherein a second side board of the protection shell, which is opposite to the first side board, integrates, without interruptions, with a second protection panel, which has, in a mirror-like manner, the same shape and the same size as the first protection panel.

4. A car according to claim 1 and comprising a bracket (B), which, on one side, is rigidly connected to the first protection panel and, on the opposite side, is rigidly connected to the door.

5. A car according to claim 4, wherein the bracket (B) is rigidly connected to the first protection panel by means of three screws.

6. A car according to claim 1, wherein the door comprises:
   a lower reinforcement bar, which has a straight shape, is oriented longitudinally, and is arranged in line with a central portion of the door; and
   an upper reinforcement bar, which has the shape of an obtuse angle and is arranged in line with an upper portion of the door.

7. A car according to claim 6, wherein the lower reinforcement bar is arranged below the belt line and the upper reinforcement bar is arranged above the belt line.

8. A car according to claim 6, wherein the upper reinforcement bar comprises an inclined front part, which runs along a post of a windscreen, and a horizontal rear part.

9. A car according to claim 6, wherein the front end of the lower reinforcement bar ends in line with a hinge of the door.

10. A car according to claim 6 and comprising a bracket (B), which, on one side, is rigidly connected to the first protection panel and, on the opposite side, is rigidly connected, on a lower side, to the lower reinforcement bar and, on an upper side, to the upper reinforcement bar.

* * * * *